United States Patent [19]

Davis et al.

[11] Patent Number: 4,634,956
[45] Date of Patent: Jan. 6, 1987

[54] DC TO DC CONVERTER

[75] Inventors: Walter L. Davis, Coral Springs; Michael J. DeLuca, Boca Raton; William G. Siegel, Plantation, all of Fla.

[73] Assignee: Motorola, Inc., Schaumburg, Ill.

[21] Appl. No.: 690,216

[22] Filed: Jan. 10, 1985

[51] Int. Cl.⁴ .............................................. G05F 1/10
[52] U.S. Cl. ................................. 323/222; 323/283; 323/284; 323/285; 323/288
[58] Field of Search ............... 323/222, 282, 283, 284, 323/285, 288, 351

[56] References Cited

U.S. PATENT DOCUMENTS

| | | | |
|---|---|---|---|
| 3,541,420 | 11/1970 | Rees | 323/222 |
| 3,772,588 | 11/1973 | Kelly et al. | 323/285 |
| 3,913,006 | 10/1975 | Fillmore | 323/222 |
| 3,974,439 | 8/1976 | Holland | 323/222 |
| 4,017,789 | 4/1977 | Morris | 323/285 |
| 4,037,271 | 7/1977 | Keller | 363/21 |
| 4,276,586 | 6/1981 | Boekhorst | 363/21 |
| 4,355,277 | 10/1982 | Davis et al. | 323/222 |
| 4,399,500 | 8/1983 | Clarke et al. | 363/21 |
| 4,504,776 | 3/1985 | Haville | 323/288 |

Primary Examiner—Patrick R. Salce
Assistant Examiner—Anita M. Ault
Attorney, Agent, or Firm—Daniel K. Nichols; Joseph T. Downey; Donald B. Southard

[57] ABSTRACT

A DC to DC converter includes a power input for receiving power at a predetermined input voltage. The converter is current-controlled to provide output power at a predetermined output voltage and several output current levels. The converter is further selectively controlled for either continuous or intermittent mode of operation. The continuous mode provides the higher output current levels and the intermittent mode provides the lowest output current level.

15 Claims, 16 Drawing Figures

DC TO DC CONVERTER

BACKGROUND OF THE INVENTION

This invention relates to DC to DC converters in general and in particular, to a DC to DC converter having more than one current output level including a very low current level. A prior DC to DC converter is illustrated in U.S. Pat. No. 4,355,277 issued Oct. 19, 1982. This prior art device is a pulse width modulation type of DC to DC converter that is capable of efficiently operating at two or more output current levels. The output current is controlled by the application of different levels of base bias current to the control transistors of the converter. When a lower level output current is desired, a lower base current level is supplied to the operating transistors. When a higher output current is required, additional base current is supplied to the control transistors of the converter.

This type of circuit might best be thought of as operating in a continuous mode, that is, the converter is turned on at all times, with all elements of the converter being fully operational and the current efficiency is optimized by controlling the base bias current. Thus, energy is delivered to the output load during each cycle of the fixed operating frequency that is determined by the ramp generator.

Such a circuit becomes very inefficient when an extremely low output is required in addition to the normal output levels. For example, where only a 5 or 10 microamp output current is required, the operating power consumed by the DC to DC converter will be substantially higher than the output power from the converter.

One particular application where energy efficiency is important is in portable paging radios. Such devices are commonly constructed with severe constraints on physical size and weight and must be designed to be powered by a single cell battery. Due to the limited battery capacity it is important to minimize current drain in order to maximize the operating life of a battery in the unit.

In such a device it is frequently necessary to provide an operating voltage higher than the battery voltage in order to power certain circuits as, for example, a microprocessor based decoder. Such a device is shown in FIG. 2 and is discussed in the U.S. Pat. No. 4,355,277. In this figure, a DC to DC converter designed for two output current levels is illustrated.

An OR input composed of a NOR gate and an inverter are connected to the DC to DC converter in order to selectively enable the higher current output. The NOR gate includes two inputs, one of which could be considered the state select signal input and can be controlled by a microcomputer or other control element to control the state of the DC to DC converter in normal operation. The other input of the NOR gate is provided as an override, in the event that the output voltage of the DC to DC converter drops below some predetermined value, the low voltage sensor would be triggered to switch the DC to DC converter into the higher current output mode of operation as well as actuating reset logic associated with the paging receiver.

By providing dual current level outputs, an increase in the operating efficiency over that of a single level DC to DC converter is achieved. However, in an application such as a paging receiver, a substantial portion of the operating time of the device can correspond to an extremely low current demand level. Further, recent advances in the design of microprocessor based paging decoders have led to a drastic reduction in the power drain of decoders when they are in the low power operating mode. At such low output levels, a DC to DC converter operating in a continuous low current mode will be very inefficient.

SUMMARY OF THE INVENTION

This invention comprises a DC to DC converter that is capable of operating in both a continuous mode for providing one or more higher levels of output current, and an intermittent mode in order to provide improved efficiency at one or more extremely low output current levels. In one aspect of the invention, the DC to DC converter includes a power input means for receiving power at a predetermined input voltage, current control means coupled to the power input means for providing output power at a predetermined output voltage, and control means providing selectively for continuous mode and intermittent mode operation of the converter. The continuous mode provides the higher output current levels and the intermittent mode provides the reduced output current levels. In another aspect of the invention, the control means includes a timer means for sequentially actuating or pulsing the current control means in the intermittent mode. The current control means is alternately actuated on for a first predetermined period and off for a second predetermined time period. The second time period is substantially longer than the first time period thereby providing a low duty cycle of operation of the current control means and providing a low output current level.

In yet another aspect of the invention, the DC to DC converter has a filter capacitor at its output. In the intermittent mode the converter alternately actuated ON to charge the filter capacitor to the desired B++ voltage and actuated OFF for a substantial time period thereby providing a low duty cycle of operation.

DETAILED DESCRIPTION OF A PREFERRED EMBODIMENT

Figure 1:
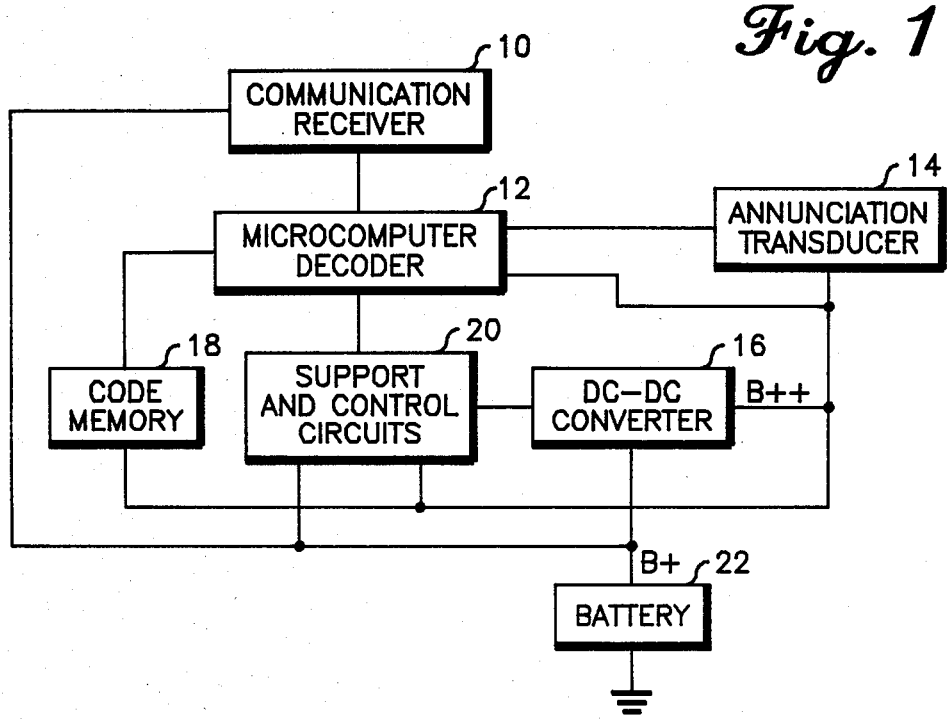
FIG. 1 is a block diagram of a paging receiver utilizing a DC to DC converter.
Figure 2:
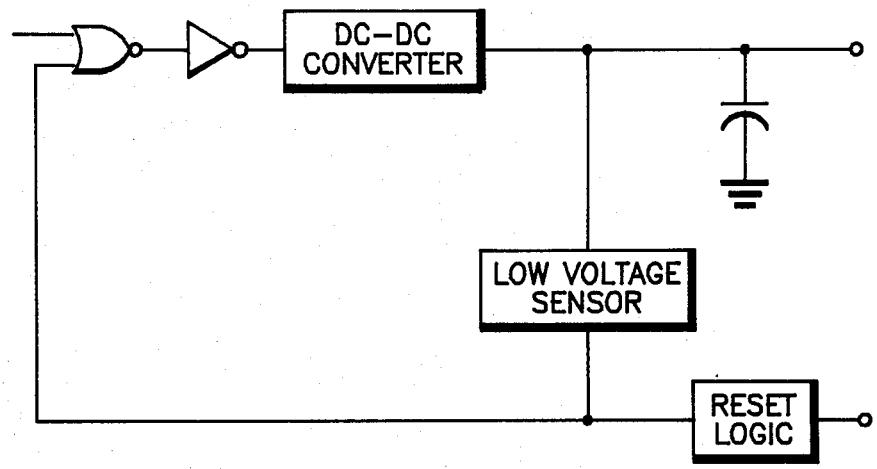
FIG. 2 is a block diagram of prior art DC to DC converter system as applied to paging receiver.

FIG. 1 shows a functional diagram of a paging receiver utilizing the present invention. Specifically, a communications receiver 10 is connected to a selective signalling decoder 12 which comprises a microcomputer. The decoder 12 is further interconnected with an annunciation transducer 14, a DC to DC converter 16, a code memory 18, and support and control circuits 20.

The receiver 10, the support and control circuits 20, and the DC to DC converter 16, are directly connected to a battery 22, which powers the operation of these blocks and is the electrical energy source for the DC to DC converter 16. The DC to DC converter 16 generates the power levels required for the operation of the decoder 12, the annunciation transducer 14, and the code memory 18.

In operation, the communications receiver 10 recovers signals transmitted over a communications channel and supplies that signal to the microcomputer decoder 12. The decoder 12 decodes the recovered signal by determining if it contains a data pattern equivalent to one of the one or more signal patterns stored in code memory 18. If a pattern match is detected, the microcomputer decoder 12 activates the annunciation transducer 14 and causes an appropriate alert signal to be generated to inform the user that a paging signal has been received.

In order to minimize the drain from the battery 22, the microcomputer decoder 12 is operated in three states: a medium power drain, fully operational state in which it can decode signals in real time; a high power drain state in which the decoder decodes signals and also generates alert output signals; and a reduced power drain, reduced computational ability state in which it merely times the interval to the next transition to the high drain state. To take full advantage of the power saving, multiple state operation of the microprocessor, the DC to DC converter power source 16 has two operational modes that correspond to the three states of the microcomputer. That is, the converter 16 has a high output mode with two output levels or states in which it can supply the power required to operate the decoder in its two highest power drain states, and a reduced output mode in which it can supply the power required to operate the decoder in its low power drain state.

Thus, in its low power output mode, DC to DC converter 16 is adjusted to supply a greatly diminished power level with maximum efficiency. When the converter 16 is in its low output mode, it cannot support the fully operational state of the microprocessor.

During the normal operation of the system, the support and control circuits 20 control the operation of the DC/DC converter 16 and switch the output mode of the converter in accordance with system demands. A control input of the DC to DC converter 16 is connector to the support and control circuits 20 and this signal path places the converter in the high output mode if the microcomputer decoder 12 should experience a program execution failure and require reinitialization.

The operation of the device disclosed in U.S. Pat. No. 4,355,277 issued Oct. 19, 1982, and entitled DUAL MODE DC to DC CONVERTER, is similar in operation to the high output mode of operation of the present invention and the disclosure of the patent is hereby incorporated by reference as if fully set out herein.

Figure 3:
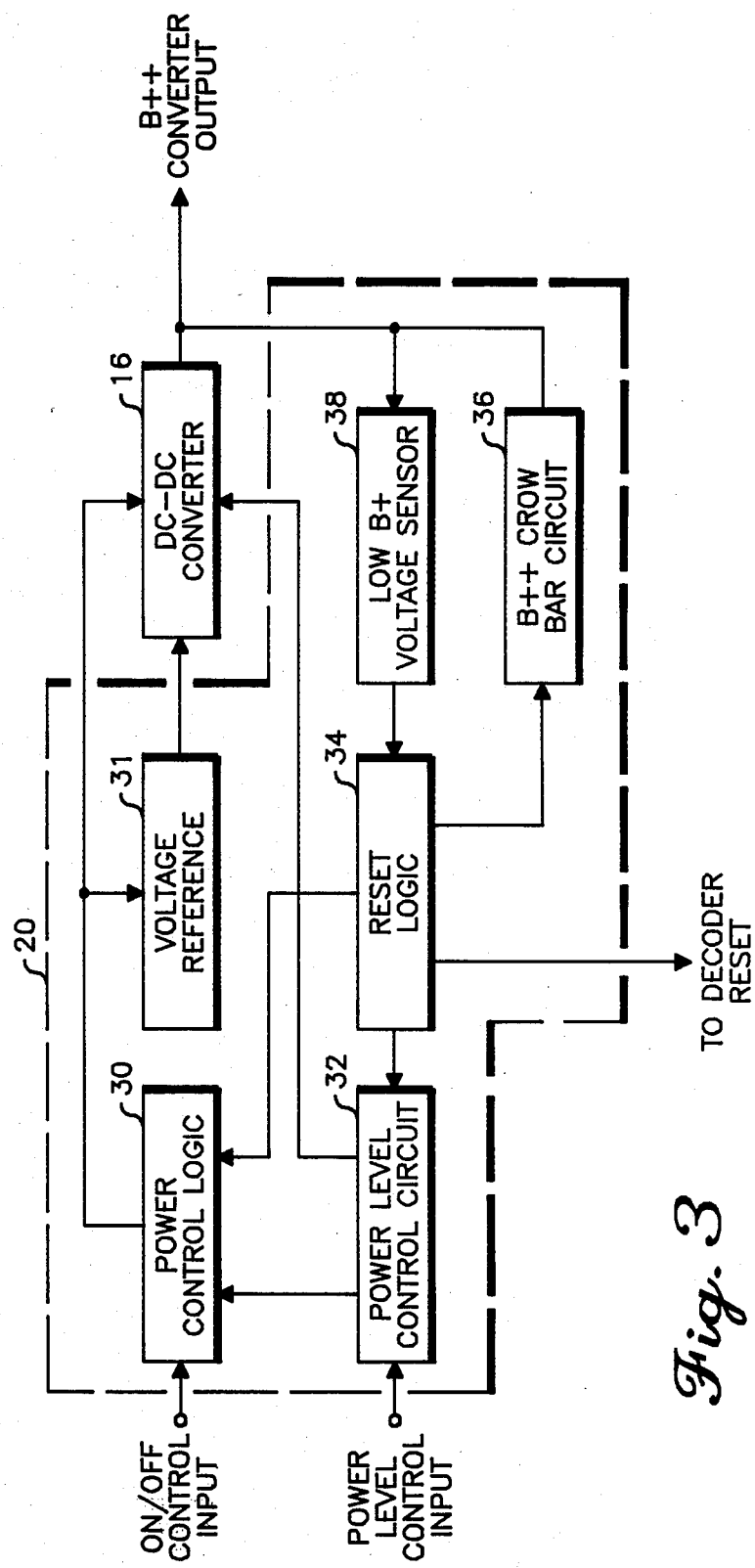
FIG. 3 is a block diagram of the DC to DC converter and control circuitry of the invention.

Referring now to FIG. 3, support and control circuits 20 is shown in more detail, including the connections to the DC to DC converter 16. A power control logic circuit 30 is connected to a voltage reference 31 and the DC to DC converter 16. The voltage reference 31 is connected directly to the DC to DC converter 16 to supply the requisite reference voltage. It will be appreciated that the power control logic 30 is utilized to control the operating state of the voltage reference 31 and DC to DC converter 16 by turning the units on and off. The power control logic 30 also controls a power level control circuit 32 which is connected to the DC to DC converter 16 for controlling its level of operation. Reset logic 34 includes outputs for controlling operation of the power control logic 30, power level control circuit 32 and B++ crowbar circuit 36 as well as providing a reset signal to the microcomputer decoder 12. The operation and use of a crow bar circuit is disclosed in U.S. patent application Ser. No. 657,637 filed Oct. 4, 1984, entitled A POWER SUPPLY CIRCUIT, which is commonly owned with this application, the disclosure of which is fully incorporated herein by reference.

An input to the reset logic 34 is connected to a low B++ voltage sensor 38 which is coupled to the B++ output of the DC to DC converter 16.

It will be appreciated that the output power level of the DC to DC converter 16 is determined both by the power control logic 30 and by the power level control circuit 32. In the event that a low B++ voltage is sensed at the output of the DC to DC converter 16, reset logic 34 is actuated by the sensor 38 to condition both the power control 30 and power level control circuit 32 for actuating the DC to DC converter 16 into a high current mode of operation to restore the output B++ to the correct level. While the preferred embodiment of the invention utilizes timed pulses to actuate the converter 16 when in the intermittent mode, it will be understood that the intermittent mode of operation could be accomplished by sensing the B++ voltage and actuating the converter 16 to restore the desired B++ voltage. At very low load current levels this demand approach would result in a low duty cycle operation of the converter 16.

Figure 4:
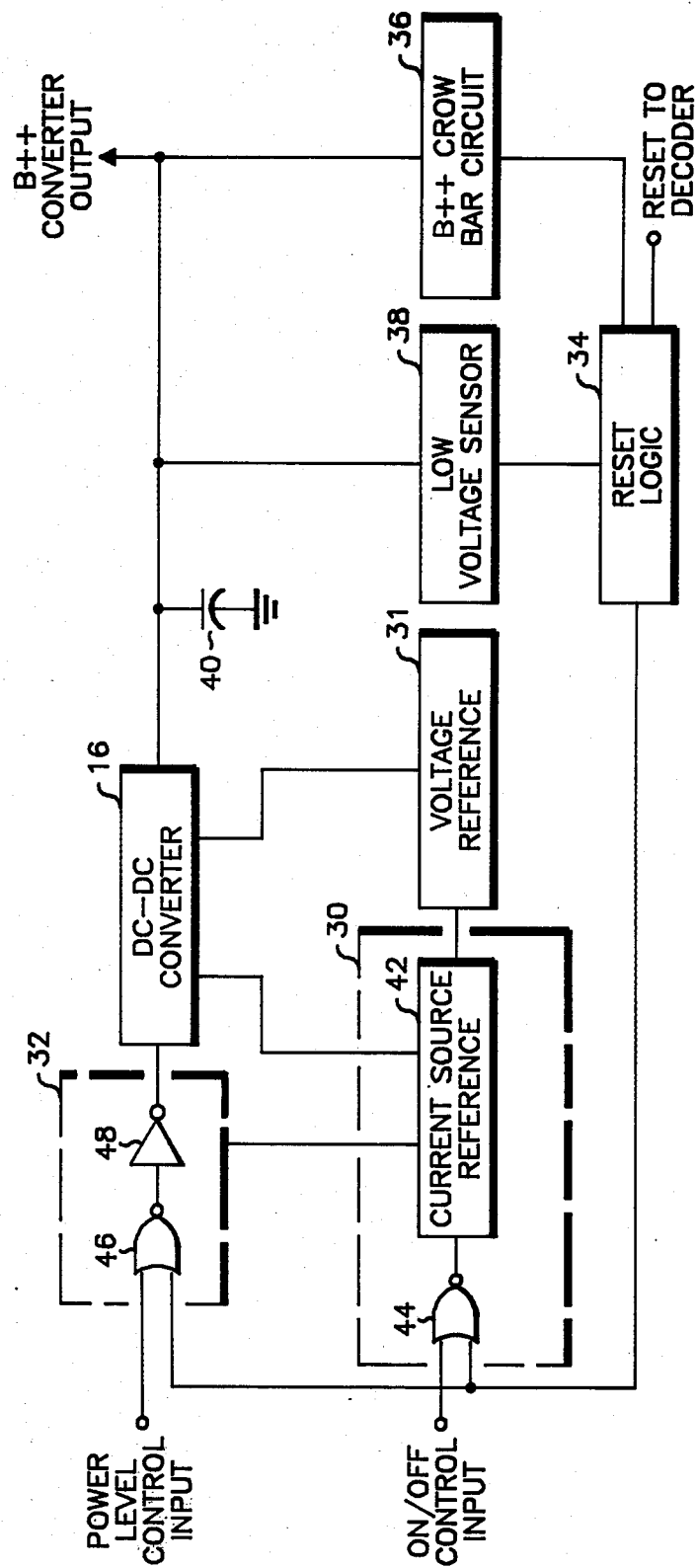
FIG. 4 is a block diagram of a DC to DC converter and control circuitry as applied to a paging receiver.

A more detailed view of the power control logic 30 and power level control circuit 32 is shown in FIG. 4. In this figure, an output filter capacitor 40 of the DC to DC converter 16 is shown apart from the block of the converter for purposes of clarity.

As shown, the power control logic 30 includes a current source reference 42, the operation of which is controlled by the output of a dual input NOR gate 44. One input of NOR gate 44 is connected to the output of reset logic 34. The other input is the ON/OFF control input which can be actuated by the microcomputer decoder 12. When a high signal is received by the NOR gate 44 on the ON/OFF control input or the input connected to the reset logic, its output goes low causing the current source of reference to be turned on to bias on the DC to DC converter 12 and the power level control input 32. The power level control circuit 32 includes a NOR gate 46, the output of which is connected to an inverter 48 thereby providing an OR function. One input to the NOR gate 46 is connected to the output of the reset logic 34 while the other input is controlled by the power level control input which can be connected to the microcomputer decoder 12. It can be seen from FIG. 4, that the DC to DC converter 16 can be turned ON and OFF by the microcomputer decoder 12 via the ON/OFF control input, and the instantaneous power output supplied by the DC to DC converter 16 is controlled by the decoder via the Power Level Control output. In addition, the decoder input control signals can be overridden by the Reset Logic 34 to turn ON the DC to DC converter 16 whenever the Low Voltage Sensor 38 determines that the output voltage of the DC to DC converter 16 has dropped below a preset level.

Since the average power output from the DC to DC converter 16 is a time average of the various operating modes—High power, Low power and OFF, it can be seen that the average power output of the converter can be varied over a wide range by the appropriate control of the inputs. In particular, as will be seen in the following description, the output power supplied by the DC to DC converter 16 and the power dissipitated in the DC to DC converter and its control circuits 20 can be varied over a wide range by pulsing the DC to DC converter 16 ON and OFF in the low power mode. This technique provides the output voltage level required to operate a CMOS microcomputer or other high voltage devices, while maintaining good operating efficiencies when only micro output power levels are required—as when a CMOS microcomputer is in the WAIT or timing mode.

Figure 5:
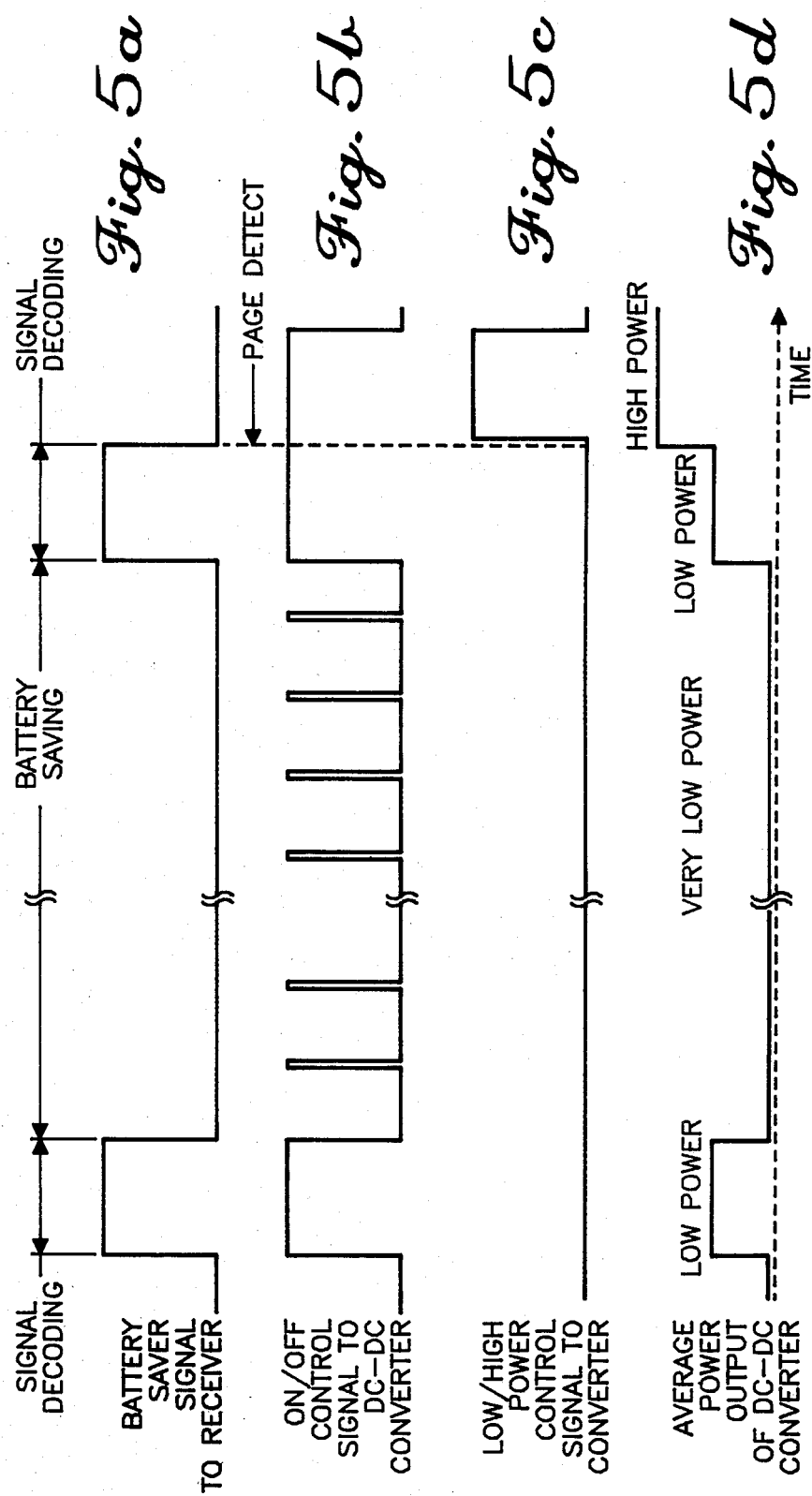
FIGS. 5A to 5D are waveform charts relating to various inputs to the DC to DC converter.

Referring now to FIG. 5, control of the DC to DC converter 16 in relation to the power level control input and the ON/OFF control input as shown in FIG. 4 will be discussed. It will be understood that in the coding system used in the preferred embodiment, the pager must be fully operational to look for its coded signal during a first predetermined time interval, and that following this first time inteval the pager can be powered down in a nondecoding state for a second predetermined interval, at the end of which the pager is again powered on to repeat the decoding sequence. Consequently the receiver 10 as well as other parts of the paging circuitry need only be powered during the signal decoding time interval. FIG. 5A shows the signal that is used to control the battery saver that applies power to the receiver. This signal provides a high during the signal decoding time interval which conditions the receiver into an on or operational condition. During the battery saving time interval a low signal is provided to the receiver in order to shut down the receiver and thus save battery power until the next signal decoding interval is reached. In one embodiment, the receiver 10 is fully powered for a signal decoding interval of 1.4 seconds, and the receiver is switched OFF for a battery saving interval of 19.4 seconds. FIG. 5B shows the waveform of the ON/OFF control signal to the DC to DC converter which is used for turning on the current source reference 42. During the signal decoding interval the current source reference and consequently the DC to DC decoder 16 is kept in a continuously on condition in the low power state.

At the end of the signal decoding time interval, the microcomputer decoder 12 switches from its fully operational decoding state to the reduced power drain, reduced computational ability state. This change in operating states reduces the current drain of the microcomputer decoder from approximately 150 microamps from the 3.0 volt output of the DC to DC converter, to approximately 5 microamps. To meet the reduced power requirements of the microcomputer decoder 12 in the time keeping mode while maintaining efficient operation, the ON/OFF control signal input is pulsed as indicated in FIG. 5B, during the battery saving interval. As in well known in the art, such a pulsed signal can be generated by the microcomputer decoder 12 or other digital timing circuitry.

It will be understood that during the ON intervals, power is stored in output capacitor 40 which will be sufficient to power the microcomputer decoder 12 in its reduced computational state until the next time the DC to DC converter 16 is pulsed ON. This can be appreciated by reference to FIG. 5D which shows the normal low power output during the signal decoding time interval and the very low power average output during the battery saving time interval.

In the preferred embodiment of the invention a Motorola 146805H2 CMOS microcomputer is used as the decoder, is used in conjunction with an OFF interval of 149 milliseconds, and the system operates properly with the resultant 3.9% duty cycle.

When a signal for the pager is received and recognized or decoded during a decoding interval, additional output power from the DC to DC converter 16 may be required to power the annunciation transducer 14 which can include a LED indicator or other signalling or indicating apparatus. Under such conditions, it is necessary to operate the DC to DC converter 16 in an even higher power output level. When a paging signal is detected during assigned decoding intevals, the ON control signal remains high to keep the converter in its continuous mode of operation and the low/high power control signal is switched high to place the DC to DC converter 16 in its high output mode of operation. Once the necessary alert signaling has been accomplished, the annunciator 14 can be switched OFF and the decoder 12 can return to the normal sequence of looking for another paging signal with the converter 16 operating at its lower power levels.

In the preferred embodiment, the DC to DC converter 16 can supply an output current of up to 500 microamperes at 3.0 volts in the LOW power continuous mode. Further, it can supply up to 3.0 milliamperes in the HIGH power continuous mode, and it can supply an average output current of up to 15 microamperes in the very low power intermittent mode for the ON-OFF duty cycle previously discussed.

Figure 6:
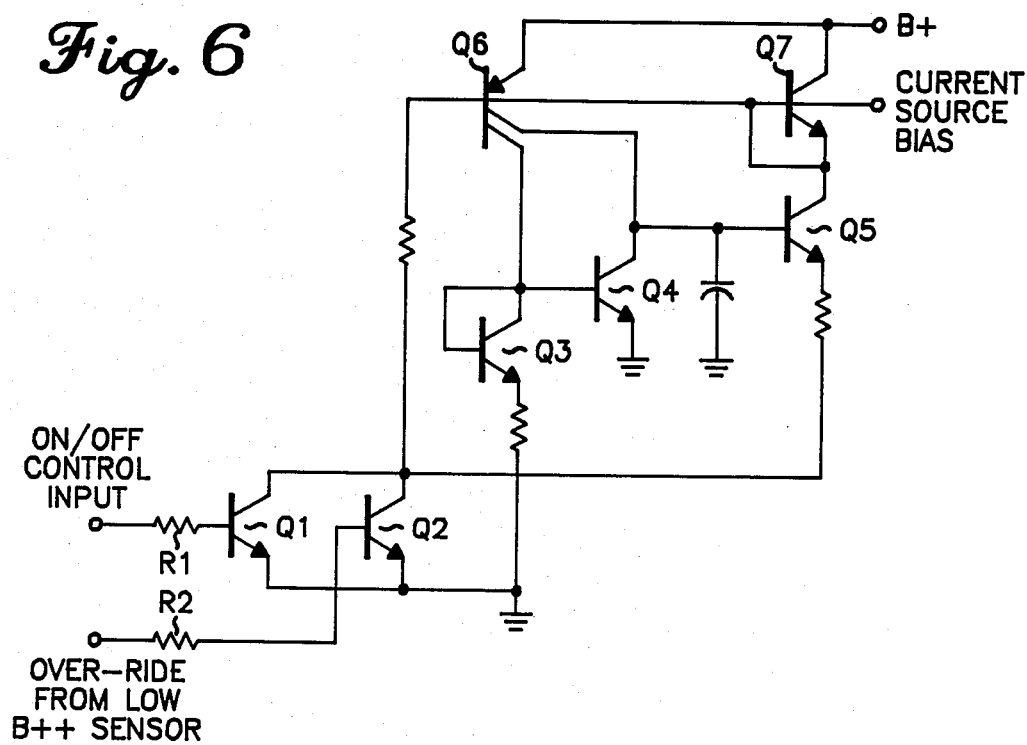
FIG. 6 is a electrical schematic diagram of the power control logic of FIG. 3.

Referring now to FIG. 6, the circuitry for the power control logic 30 is shown in detail. The ON/OFF control input is connected to the base of a transistor Q1 through resistor R1, and the override from the reset logic is connected by a resistor R2 to the base of a transistor Q2 that is connected in parallel with transistor Q1. If either Q1 or Q2 is on, a band gap current reference circuit comprised of transistors Q3, Q4, Q5, Q6 and Q7 is switched on. The current source circuit is known in the art, and establishes a specific reference current level in PNP transistors Q6 and Q7, and in the other PNP transistors in the other circuit elements that are connected to the current source bias line. In the preferred embodiment shown in FIG. 6, the current source circuit establishes a reference current of 5 microamps per emitter in each PNP transistor that has its base connected to the current source bias line and its emitter connected directly to B+. Thus, the power control logic controls the state of the other circuit elements by controlling the PNP current source transistors that power the circuit functions.

The power control logic 30 has been configured so that no power is dissipitated in the circuit when it is in the OFF state. Further, it can be seen that the over-ride signal from the reset logic 30 can directly turn on the current reference 42 regardless of the state of the ON/-OFF control input from the decoder 12. The interconnection between the low voltage sensor 38, the reset logic 34 and the power control logic 30 has been designed to insure that the output voltage of the DC to DC converter 16 cannot drop below the level required for proper operation of the microcomputer decoder 12. If the B++ output of the DC to DC converter 16 does drop to the trip level of the low voltage sensor 38, the override input to the power control logic 30 is switched high and the DC to DC converter 16 is switched ON to recharge the B++ output capacitor 40.

Figure 7:
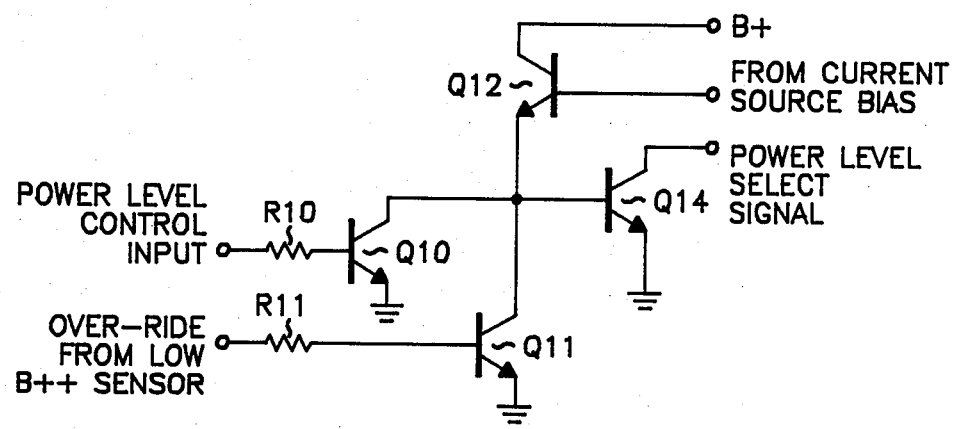
FIG. 7 is an electrical schematic diagram power level control circuit of FIG. 3.

FIG. 7 discloses the power control circuit 32 in detail. The power level control input is connected through resistor R10 to the base of a first of a transistor Q10, and the override from the reset logic 34 is connected through resistor R11 to the base of transistor Q11 which is logically connected in parallel with transistor Q10. The collectors of transistors Q10 and Q11 are connected together, to the collector of a current source PNP transistor Q12, and to the base of an NPN output transistor Q14. The emitter of Q12 is connected to B+ and its base is connected to the current source bias line from the power control logic circuit 30.

When the current source reference 42 in the power control logic 30 is off, transistor Q12 in the power level control circuit is OFF, and all of the other transistors in the circuit of FIG. 7 are also OFF. When the current reference circuit 42 is ON, the transistor Q12 generates a collector current of 5 microamps, and the state of the power level select signal is determined by the states of the power level control 32 and override input signals. If both control inputs are low, transistors Q10 and Q11 are OFF, and the collector current of Q12 flows into the base of Q14 which drives the collector of Q14 to a low level near ground. The low level on the power level select signal in turn places the DC to DC converter 16 in its lower power continuous output mode. Conversely, a high level input on either or both of the power level control and override inputs diverts the collector current of Q12 to ground, placing Q14 in the OFF state which in turn floats the collector of Q14. This condition places the DC to DC DC converter 16 in its high power output mode.

Figure 8:
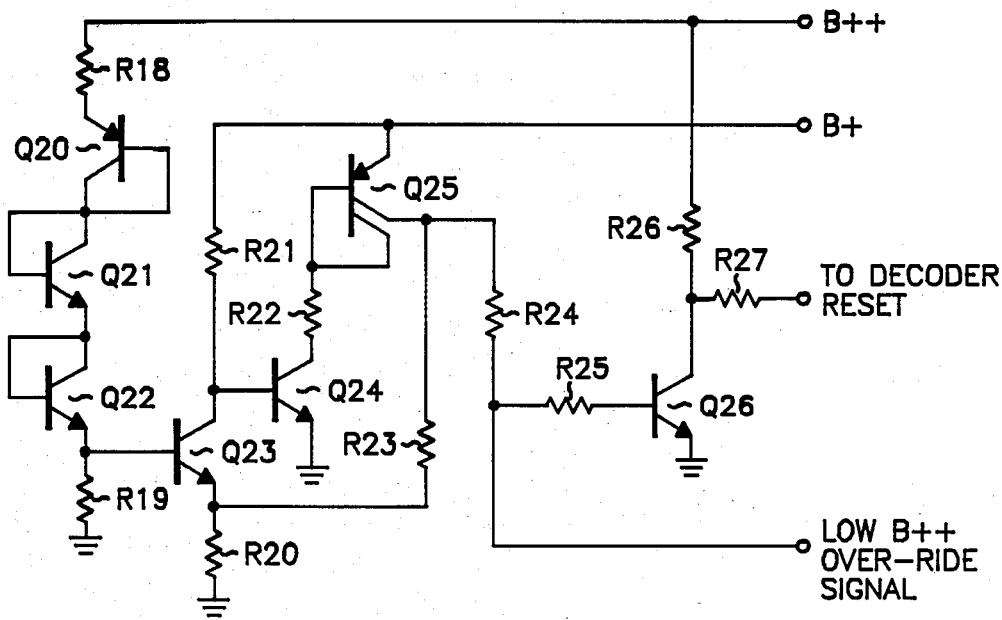
FIG. 8 is an electrical schematic diagram of the reset logic and low B++ voltage sensor of FIG. 3.

FIG. 8 is a schematic diagram of the reset logic 34 and low B++ voltage sensor 38. Here, the B++ output voltage of the DC to DC converter 16 is divided down by a voltage divider, and the output of the divider is connected to the input of a Schmitt trigger circuit. The output of the Schmitt trigger circuit generates the LOW B++ Over-Ride Signal and also drives an inverter stage, the output of which generates the reset signal that is connected to the decoder. In operation, the reset logic 34 generates the Over-ride and reset output signals whenever the B++ output of the DC to DC converter is below a predetermined level that is set at 2.7 volts in the preferred embodiment.

In the circuit, the series configuration of resistor R18, diode connected transistors Q20, Q21, and Q22, and resistor R19 form the B++ divider circuit. Transistors Q23, Q24 and Q25 and resistors R20, R21, R22, and R23 form the Schmitt trigger circuit; and the output of the Schmitt trigger at the junction of the collector of Q25 and resistor R23 drives the Low B++ Over-ride Signal output through resistor R24, and also drives an inverter stage formed by transistor Q26 and resistors R25, R26, and R27. The collector of inverter Q26 drives the Reset output line through resistor R27.

In operation, transistor Q23 is OFF, and transistors Q24 and Q25 are ON whenever the output voltage of the divider at the base of Q23 is less than approximately 0.7 volts. With transistor Q25 ON, the low B++ Override Signal line is driven to a high level to generate a signal that indicates the B++ voltage level is low, and transistor Q26 is turned ON to generate a low level reset signal on the Decoder reset line. When the output voltage of the divider is above 0.7 volts, transistor Q23 is regeneratively switched ON, and transistors Q24 and Q25 are switched OFF. Transistor Q25 being OFF generates a low level signal on the B++ Over-ride signal line, and turns off inverter Q26 which in turn generates a high level output on the Decoder reset line. This latter signal condition indicating that the B++ voltage is above the predetermined minimum value.

Thus, by appropriate selection of the component values in the divider network so that the predetermined minimum B++ voltage generates a divider output voltage of 0.7 volts, the minimum voltage can be set at any of a wide range of values.

Figure 9:
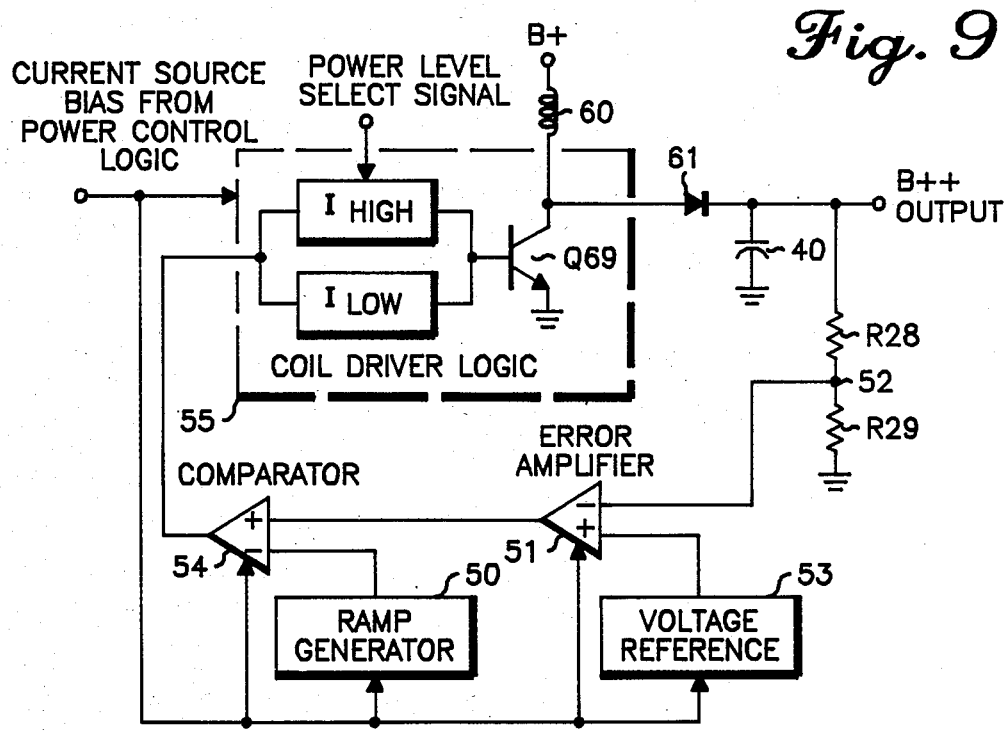
FIG. 9 is a block diagram of the DC to DC converter.

FIG. 9 is a functional diagram of DC to DC converter portion of the present invention. The converter is based on the well known pulse width modulation principle of operation, and consists of a voltage divider comprising resistors R28 and R29, having an output 52 that divides down the B++ output of the converter, a differential error amplifier 51 that compares the output of the B++ divider with the output of a voltage reference 53 and amplifies the voltage difference, a voltage comparator 54 that is connected to the output of the error amplifier 51 and to the fixed frequency output of a ramp generator 50 and which generates a variable pulse width signal at its output, and coil driven logic 55 that is connected to the output of the comparator and drives a coil step-up circuit in accordance with the comparator output signal. The converter 16 also contains a filter capacitor 40, and operation of the elements in the converter is controlled by an ON/OFF control signal from the power control logic and by the Power Level Select Signal. In operation, the DC to DC converter 16 functions much like the PWM type of step-up converter shown in the U.S. Pat. No. 4,355,277 in that a pulsed drive waveform is applied to the coil, and the fly-back characteristic of the coil is used to generate a stepped-up output voltage that is regulated by feedback control of the width of the pulse applied to the coil. Further, as shown in the U.S. Pat. No. 4,355,277 patent the transistor that drives the coil is also provided with two selectible levels of base drive that determine the output power of the converter in its continuous mode of operation.

However, in addition, the elements in the DC to DC converter 16 of the present invention are also controlled by a Power Control Logic signal that can be used to rapidly turn the elements of the converter ON and OFF. Further, the elements of the converter 16 and the method of controlling the elements have been designed so that they dissipate zero power when they are OFF. Since when the DC to DC converter is ON, its method of operation is similar to that of the circuitry shown in the '277 patent, and all of the functional elements are OFF and dissipate zero power in the OFF state, the detailed operation of the PWM converter need not be covered here. The important new aspect of the present invention is to recognize that, by proper design of the converter elements and the control interfaces, the converter can be pulsed ON and OFF over a wide duty cycle range to provide for the efficient generation of a wide range of output powers. Further, very low output power levels can be generated at essentially the same efficiency that normal and high output powers can be generated in the continuous or unswitched operating mode. Thus, it is possible to rapidly switch the DC to DC converter ON and OFF to control the output power level, and this ON and OFF switching can be used to efficiently generate the desired B++ output voltage level at very low output power levels.

Figure 10:
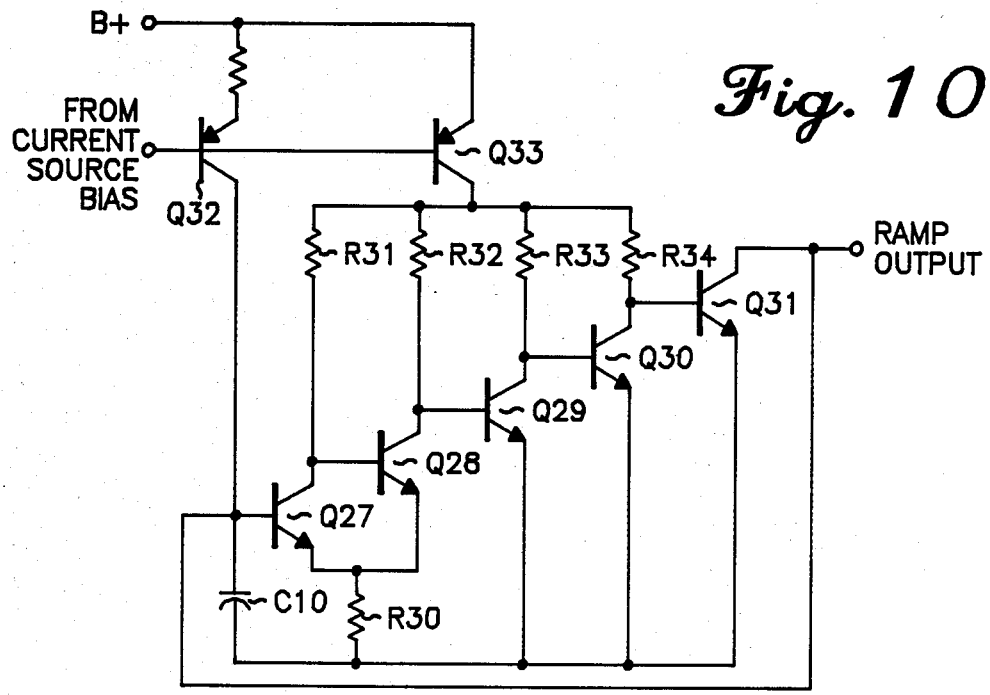
FIG. 10 is an electrical schematic diagram of the ramp generator of FIG. 9.

FIG. 10 is a schematic diagram of the ramp generator 50. Here a capacitor C10 is charged with a current source comprising transistor Q32 until the voltage on the capacitor C10 reaches the trip point of a Schmitt trigger, at which time the capacitor is quickly discharged to ground and a new charge cycle is started.

In the ramp generator, 50, transistors Q27 and Q28 and resistors R30, R31 and R32 form a Schmitt trigger, and transistors Q29, Q30 and Q31 and resistors R33 and R34 form inverting amplifier stages. When the voltage on capacitor C10 at the base of Q27 is less than 0.7 volts, transistors Q27, Q29 and Q31 are biased OFF and transistors Q28 and Q30 are biased ON. Thus, the collector current from transistor Q32 charges capacitor C10 towards the B+ supply. When the voltage on C10 reaches 0.7 volts, the Schmitt trigger regeneratively changes state and transistor Q27 switches ON. This, in turn switches Q28 OFF, Q29 ON, Q30 OFF and Q31 ON. The resulting collector current of Q31 then quickly discharges capacitor C10 to a voltage near ground and the charge cycle starts again. Thus, because capacitor C10 is charged with a constant current, the output of the ramp generator 50 is a constant frequency ramp signal with a steep cut-off and the PWM output of the comparator 54 in the DC to DC converter 16 is also at the same fixed frequency. In the preferred embodiment, the ramp generator 50 operates at a nominal frequency of 83 kilohertz.

It will be recognized that the PNP current source transistors Q32 and Q33 in the ramp generator 50 are controlled by the current source reference 42 in the power control logic 30. Thus, transistors Q32 and Q33 are off and the ramp generator 50 dissipates zero power when the current reference 42 is off. Similarly, transistor Q32 is biased ON to a collector current level of 2.5 microamperes and Q33 is biased ON to a collector current level of 10 microamperes.

Figure 11:
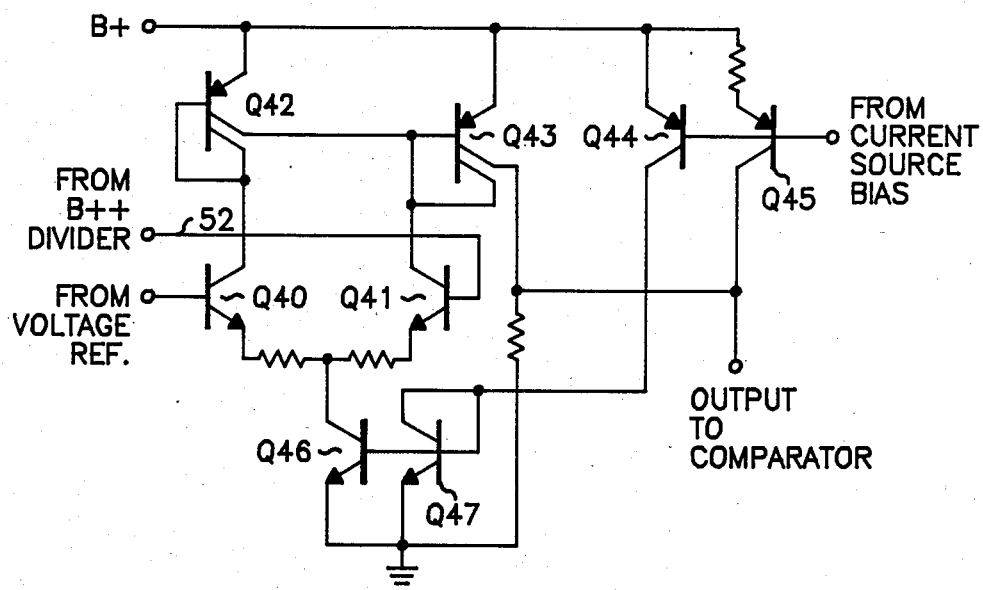
FIG. 11 is an electrical schematic diagram of the error amplifier of FIG. 9.

FIG. 11 is an electrical schematic diagram of the error amplifier 51. Here the divided-down B++ voltage 52 and the output voltage from the voltage reference 53 are coupled to the inputs of the error amplifier 51, and the amplified error or difference signal output is applied to the input of the comparator 54.

In the amplifier 51, transistors Q40, Q41, and Q42 comprise a differential input stage with active loads, and transistor Q43 comprise an output gain stage that is coupled to the output of the differential stage.

Transistors Q44 and Q45 are current sources that are controlled by the current reference circuit 42 of the power control logic 30. When the current reference 42 is ON, transistor Q44 generates a collector current of 5 microamperes that is in turn mirrored by the combination of transistors Q46 and Q47 to supply an operating current of ten microamperes for the input differential stage. Transistor Q45 generates a current of 1.0 microampere that adds a small current to the output of the error amplifier 51. The function of current source Q18 is to provide a very small current to the output of error amplifier 44. This will insure that the output of the error amplifier never goes below the lowest voltage of the ramp signal, Vsat of transistor Q31, so that at least a minimum duty cycle PWM signal will always appear at the output of the comparator 54. This is necessary to insure operation when the system is initially powered up from a zero energy state. The output of the error amplifier 54 represents the difference between B++ and a fixed reference voltage and will be used to maintain B++ at the referenced voltage.

Again, the error amplifier dissipating zero power when the power control logic is OFF.

Figures 12, 13:
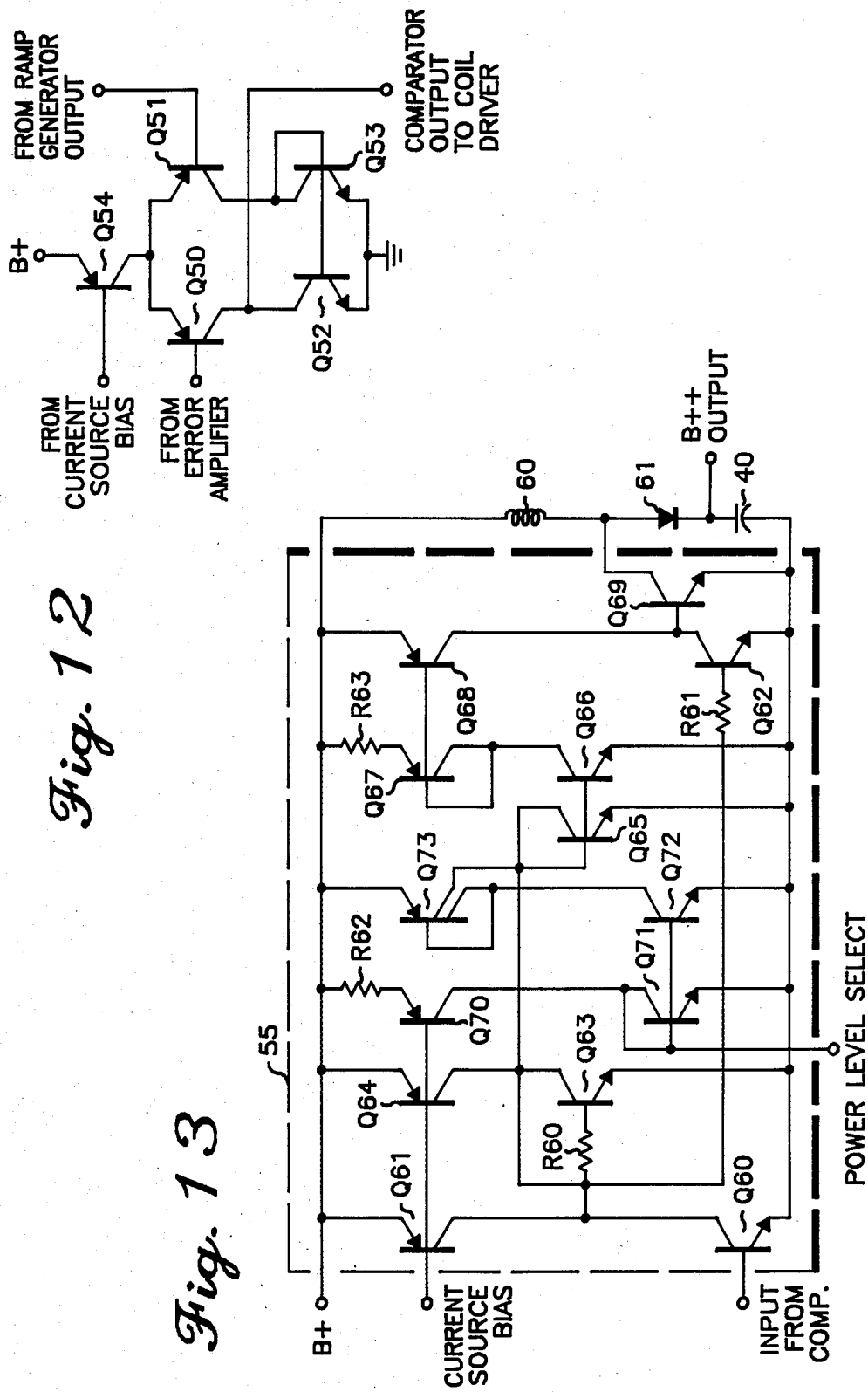
FIG. 12 is an electrical schematic diagram of the comparator of FIG. 9.
FIG. 13 is an electrical schematic diagram of the coil driver logic of FIG. 9.

FIG. 12 is a schematic diagram of the comparator circuit 54. Here, the output of the error amplifier 51, and the ramp signal from the ramp generator 50 are connected to inverting and non-inverting inputs of the comparator 54. The comparator 54 consists of a single differential stage comprised of input transistors Q50 and Q51, and active load transistors Q52 and Q53. The operating current for the differential stage is provided by current source transistor Q54, which is controlled by the current reference circuit 42 in the power control logic 30 to provide five microamps when the system is ON.

The output of the comparator 54 is a pulse at the frequency of the ramp output signal, with the width of the pulse determined by the error amplifier output signal.

It will be observed from the schematic diagrams that, with the widespread use of current sources and current multiplication, the circuits are particularly well suited for an integrated circuit implementation on a small chip area. It is also to be noted that the circuits operate at the one-cell B+ voltage and that performance is not degraded in the low current operational state.

In the electronic schematic diagram of FIG. 13, the comparator 54 output is coupled to the base of a transistor Q60. It will be recalled that this is a pulse width modulated (PWM) signal and is the control signal which keeps the B++ voltage at the desired level; i.e., performs a regulating function. When the PWM signal is low, the Q60 output is high and the current from a current source formed by transistor Q61, via resistors R60 and R61, switches on transistors Q62 and Q63. When transistor Q63 is active, it sinks all of the current provided by the current sources formed by transistors Q64 and Q73. When the PWM signal is high, the output of Q60 is low and Q63 and Q62 are cut off. When Q63 is not conducting, the current provided by the current sources which include transistors Q64 and Q73 are diverted to a current mirror pair, formed by transistors Q65 and Q66. This current mirror multiplies the reference current by a factor of two and transistor Q66 then sinks this multiplied current from the base of a transistor Q67. Transistors Q67 and Q68 also form a current mirror which has a variable multiplication factor. That is, due to the presence of resistor R63 in the emitter circuit of transistor Q67, transistors Q67 and Q68 form a nonlinear amplifier, the exact multiplication factor is dependent on the current which is conducted. The amplified current generated by the current mirror Q67 and Q68 is sent to the base of a transistor Q69 which, when conducting, establishes a current flow in the inductor 60. Thus, when the PWM signal is high, transistor Q69 conducts. When the PWM signal is low, transistor Q69 is cut off.

As was mentioned earlier, the PWM signal going high activates transistors Q60, Q65, Q66, Q67 and Q68 thus providing drive current to the switching transistor Q69. Transistor Q62 is off when transistor Q68 is conducting.

When the PWM signal goes low, transistors Q60, Q65, Q66, Q67, and Q68 turn off and transistor Q62 turns on. When Q62 conducts, it draws all available current from the switching transistor Q69, thus cutting Q69 off and insuring the rapid switching of Q69.

When transistor Q69 conducts, current flow is established in the inductor 60. When Q69 is cut off, the current in the inductor 60, which cannot change instantaneously, is diverted through the output diode 61 to the load capacitor 40. Since the coil current is changing during this period, a voltage increase is generated across the coil which is significantly higher than the supply voltage.

In the high current state, a high input at the power level select input 63 allows the current supplied by a current source, composed of transistor Q70 and a resistor R62 in series with its emitter, to flow through the current mirror formed by transistors Q71 and Q72. This current mirror amplifies this current X2 and sinks the multiplied current from the base of the current mirror Q73. This current mirror device amplifies this current X3 and sources the amplified current to the base of Q65. This current is added to the current which is present in the medium current state for converter 16.

In the preferred embodiment, current sources Q61 and Q64 supply approximately four microamps. Current source Q70 supplies approximately two microamps. Therefore, the collector current in Q66 will be approximately eight microamps in the low current state and eight microamps plus 24 or 32 microamps in the high current state. The non-linear current amplifier formed by Q67 and Q68 provides another current multiplication of 2.8 in the low current state and 8.3 in the high current state and the base current supplied to Q69 is approximately 22 in the low current state and 250 microamps in the high current state. These base current drive levels are sufficient to allow for proper operation of the asociated mircroprocessor.

In the drawing, coil 60, diode 61 and capacitor 40 are separated from the remaining portion of the circuit by a broken line as a natural partition to distinguish those components which would not be implemented on an IC.

The DC to DC converter 16 detailed in the previous descriptions and drawings utilizes two operating modes—a continuous mode and a non-continuous or pulsed mode, that is the intermittent mode—to provide for efficient operation over a very wide range of output power levels. In the preferred embodiment, the invention is used to efficiently provide an output current that ranges from 5 microamperes at 3.0 volts to 3.0 milliamperes at 3.0 volts, or an output current range of 600 to 1.

It will be recognized by individuals skilled in the art that variations can be made to the preferred embodiment of the invention. One modification would be to use a low B++ voltage sensor to turn ON the DC to DC converter whenever it dropped to a predetermined lower level and keep it on until the B++ voltage reaches a predetermined higher level. In this way, the timer means that controls the ON and OFF pulsed operation of the DC to DC converter in the intermittent mode could be eliminated and replaced by such voltage sensor elements.

We claim:

1. A DC to DC converter comprising:
   power input means for receiving power at an input voltage,
   current-controlled means coupled to the power input means for providing output power at a predetermined output voltage, and
   control means providing selectively for continuous mode and intermittent mode operation of the converter, the continuous mode providing a first output current level and the intermittent mode providing a second reduced output current level,
   the control means sequentially actuating the current-controlled means when the converter is in said intermittent mode, wherein the current-controlled means is alternately actuated ON for a first predetermined time period and OFF for a second predetermined time period to provide the reduced power output level.

2. A DC to DC converter as defined in claim 1, in which:
   the control means includes voltage sensor means responsive to said output voltage, and selectively actuating the converter into said continuous mode when said output voltage falls below a second predetermined value.

3. A DC to DC converter as defined in claim 1, in which: said control means provides a substantially longer second time period than said first time period, thereby providing a low duty cycle of operation of the current-controlled means for providing a low output current level.

4. A DC to DC converter as defined in claim 1, in which:
   the control means includes current source bias means for controlling current to the current-controlled means and selectively providing a third output current level.

5. A DC to DC converter as defined in claim 4, in which:
   said third output current level is the highest output current level and is provided in said continuous mode.

6. A DC to DC converter as defined in claim 4 in which:
   the control means includes voltage sensor means responsive to said output voltage to selectively actuating the converter into said highest output current level.

7. A DC to DC converter as defined in claim 4, in which:
   output current level in the continuous mode is determined by the current level from the current bias source, and output current level in the intermittent mode is determined by the ratio of the first and second predetermined time periods.

8. A DC to DC converter as defined in claim 1, in which:
   the power-controlled means is pulse width modulated at a predetermined frequency having a corresponding time period for providing said output voltage.

9. A DC to DC converter as defined in claim 8, in which:
   said first and second predetermined time periods are substantially greater than said time period of the pulse width modulation.

10. A DC to DC converter comprising:

power input means for receiving power at an input voltage, power output means for providing power at an output voltage, and control means providing selectively for continuous mode or intermittent mode operation of the converter, the continuous mode providing a first output current level and the intermittent mode providing a second reduced output current level, the control means sequentially actuating the converter in said intermittent mode, wherein the converter is alternately actuated ON for a first predetermined time period and OFF for a second predetermined time period.

11. A DC to DC converter as defined in claim 10, in which:

the control means includes voltage sensor means responsive to said output voltage, and selectively actuating the converter into said continuous mode when said output voltage falls below a predetermined lower value.

12. A DC to DC converter as defined in claim 10, in which:

said control means provides a substantially longer second time period than said first time period, thereby providing a low duty cycle of operation of the converter for providing a low output current level.

13. A DC to DC converter as defined in claim 10, in which:

the control means selectively actuates the converter to provide a third highest power level in the continous mode.

14. A DC to DC converter as defined in claim 13, in which:

the control means includes voltage sensor means responsive to said output voltage to selectively actuating the converter into said highest output current level.

15. In a paging receiver having three operational states corresponding to three power levels:

a DC to DC converter having a continuous mode of operation, the continuous mode of operation including a first state of operation providing a first output level, a second state of operation at an increased output level provided by providing higher bias current to the converter, and an intermittent mode of operation providing a third lowest state output level provided by pulsing the operation of the converter ON and OFF, the converter being alternately actuated ON for a first predetermined time period and OFF for a second predetermined time period in said intermittent mode of operation.

* * * * *